(12) United States Patent
Liou et al.

(10) Patent No.: US 9,868,275 B2
(45) Date of Patent: Jan. 16, 2018

(54) METHOD FOR PREPARING CARBON FIBER COMPOSITE MATERIAL

(71) Applicant: Industrial Technology Research Institute, Hsinchu County (TW)

(72) Inventors: Shir-Joe Liou, Hsinchu (TW); Jih-Hsiang Yeh, Hsinchu (TW); Chih-Cho Shih, Hsinchu (TW)

(73) Assignee: INDUSTRIAL TECHNOLOGY RESEARCH INSTITUTE, Hsinchu County (TW)

( * ) Notice: Subject to any disclaimer, the term of this patent is extended or adjusted under 35 U.S.C. 154(b) by 90 days.

(21) Appl. No.: 15/053,864

(22) Filed: Feb. 25, 2016

(65) Prior Publication Data

US 2016/0176176 A1    Jun. 23, 2016

Related U.S. Application Data

(62) Division of application No. 13/967,726, filed on Aug. 15, 2013, now Pat. No. 9,308,705.

(30) Foreign Application Priority Data

Dec. 3, 2012  (TW) .............................. 101145234 A

(51) Int. Cl.
*B32B 37/12* (2006.01)
*B32B 5/26* (2006.01)
(Continued)

(52) U.S. Cl.
CPC ................ *B32B 37/12* (2013.01); *B32B 5/26* (2013.01); *B32B 9/047* (2013.01); *B32B 27/08* (2013.01);
(Continued)

(58) Field of Classification Search
CPC ..... Y10T 156/10; Y10T 428/239; B32B 9/04; B32B 5/26; B32B 7/12
(Continued)

(56) References Cited

U.S. PATENT DOCUMENTS

| 5,671,142 A | 9/1997 | Tatarazako |
| 2004/0067364 A1 | 4/2004 | Ishikawa et al. |

(Continued)

FOREIGN PATENT DOCUMENTS

| CA | 2 774 403 A1 | 3/2012 |
| CA | 2 778 607 A1 | 4/2012 |

(Continued)

OTHER PUBLICATIONS

Fereidoon et al., :Damping Augmentation of Epoxy Using Carbon Nanotubes, Int'l J. of Polymeric Materials, vol. 60, pp. 11-26 (2011).

(Continued)

*Primary Examiner* — Brent T O'Hern
(74) *Attorney, Agent, or Firm* — Muncy, Geissler, Olds & Lowe, P.C.

(57) ABSTRACT

A method for preparing a carbon fiber composite material is provided. The method includes providing a first carbon fiber layer and a second carbon fiber layer; binding a first surface of the first carbon fiber layer with the second carbon fiber layer to obtain a laminated article, wherein a resin containing carbon nanotubes is formed on the first surface or a second surface of the first carbon fiber layer and the carbon nanotubes have functional groups on the surface thereof; and shaping the laminated article.

9 Claims, 2 Drawing Sheets

(51) Int. Cl.
  *B32B 27/08* (2006.01)
  *B32B 27/12* (2006.01)
  *B32B 27/20* (2006.01)
  *B32B 27/30* (2006.01)
  *B32B 27/34* (2006.01)
  *B32B 27/38* (2006.01)
  *B32B 9/04* (2006.01)
  *B32B 37/14* (2006.01)

(52) U.S. Cl.
  CPC .............. *B32B 27/12* (2013.01); *B32B 27/20* (2013.01); *B32B 27/306* (2013.01); *B32B 27/34* (2013.01); *B32B 27/38* (2013.01); *B32B 37/14* (2013.01); *B32B 2250/42* (2013.01); *B32B 2255/02* (2013.01); *B32B 2255/26* (2013.01); *B32B 2260/021* (2013.01); *B32B 2260/046* (2013.01); *B32B 2262/106* (2013.01); *B32B 2262/108* (2013.01); *Y10T 156/1044* (2015.01); *Y10T 428/239* (2015.01); *Y10T 428/25* (2015.01)

(58) Field of Classification Search
  USPC .............................................. 156/60; 428/76
  See application file for complete search history.

(56) References Cited

U.S. PATENT DOCUMENTS

| | | | |
|---|---|---|---|
| 2004/0262581 A1 | 12/2004 | Rodrigues | |
| 2006/0267235 A1 | 11/2006 | Ma et al. | |
| 2007/0066171 A1* | 3/2007 | Bystricky | B82Y 30/00 442/186 |
| 2010/0173099 A1 | 7/2010 | Saito et al. | |
| 2010/0283174 A1 | 11/2010 | Ma et al. | |
| 2011/0285049 A1 | 11/2011 | Baker et al. | |

FOREIGN PATENT DOCUMENTS

| | | |
|---|---|---|
| CN | 1369925 A | 9/2002 |
| CN | 1813314 A | 8/2006 |
| CN | 101250770 A | 8/2008 |
| CN | 102549050 A | 7/2012 |
| CN | 102700203 A | 10/2012 |
| DE | 10 2010 022 469 A1 | 12/2011 |
| JP | S 58-53769 A | 3/1983 |
| JP | S 60-237896 A | 11/1985 |
| JP | 2007-095471 A | 4/2007 |
| JP | 2008-081695 A | 4/2008 |
| JP | 2009-013327 A | 1/2009 |
| JP | 2010-147526 A | 7/2010 |
| JP | 2011-162898 A | 8/2011 |
| TW | 200946302 A | 11/2009 |
| TW | 201018084 A | 5/2010 |
| TW | 201041218 A | 11/2010 |
| TW | 489136 | 6/2012 |
| TW | M430382 U | 6/2012 |
| WO | WO 2009/007617 A2 | 1/2009 |

OTHER PUBLICATIONS

Zhou et al., "Interfacial Damping Characteristics of Carbon Nanotube-Based Composites," Composites Sci & Tech, vol. 64, pp. 2425-2437 (2004).
Suhr et al., "Viscoelasticity in Carbon Nanotube Composites," Nature Materials Letters, vol. 4, pp. 134-137 (Feb. 2005).
Ghavanloo et al., "Vibration and Instability Analysis of Carbon Nanotubes Conveying Fluid and Resting on a Linear Viscoelastic Winkler Foundation," Physica E, vol. 42, pp. 2218-2224 (2010).
Gou et al., "Development and Characterization of Carbon Nanopaper-Based Nanocomposite Materials," Proc. of SPIE, vol. 6170, pp. 61701O-1-61701O-9 (2006).
Kim et al., "Edge-functionalized graphene-like platelets as a co-curing agent and a nanoscale additive to epoxy resin", J. Mater. Chem., 2011, No. 21, pp. 7337-7342.

* cited by examiner

METHOD FOR PREPARING CARBON FIBER COMPOSITE MATERIAL

CROSS-REFERENCE TO RELATED APPLICATIONS

This application is a Divisional Application of U.S. patent application Ser. No. 13/967,726 filed on Aug. 15, 2013, which issued as U.S. Pat. No. 9,308,705 on Apr. 12, 2016, for which priority is claimed under 35 U.S.C. § 120; and this application claims priority of application Ser. No. 10/145,234, filed in Taiwan, R.O.C. on Dec. 3, 2012 under 35 U.S.C. § 119. The entirety of the above-mentioned patent applications is hereby incorporated by reference herein and made a part of this specification.

TECHNICAL FIELD

This disclosure relates to a method for preparing a carbon fiber composite material.

BACKGROUND

As time progresses, the increase of demands and the requirement for energy saving make the development of the polymer fiber composite material towards lightweight and high-strength. The applications in the sport equipments (such as bicycles, golf clubs, rackets, baseball bats and the like), wind turbine blades and industrial production equipments are developed towards light weight and enhanced strength. Meanwhile, the damping problem caused by the structural vibration of the polymer fiber composite material has to be addressed so as to improve the application performance of the industrial equipment.

For example, when a transportation mechanical arm moves at a high speed (2.8 m/s) and rotates (210°/second), it will generate displacement, deformation and vibration. If the time from swing generated by the deformation, which is caused by the movement of the mechanical arm made of the polymer fiber composite material, to stationary is too long, it will need a long period to make the swing stop or reduce the amplitude for proceeding the next step. Therefore, it is bound to affect the capacity and necessary to reduce the vibration attenuation time so as to maintain the capacity.

Typically, a multilayer polymer composite material is mainly prepared by laminating, i.e. a plurality of the polymer fiber layers are superimposed and the fiber angles between the upper and lower polymer fiber layers are adjusted so as to achieve the desired mechanical or physical properties, or to adjust the thickness of the laminated layers or the thickness of the polymer. However, such adjustments or changes are still limited.

SUMMARY

The present disclosure provides a method for preparing a carbon fiber composite material, comprising providing a first carbon fiber layer and a second carbon fiber layer; binding a first surface of the first carbon fiber layer with the second carbon fiber layer to obtain a laminated article, wherein a resin containing carbon nanotubes is formed on the first surface or a second surface of the first carbon fiber layer and the carbon nanotubes have functional groups on the surface thereof; and shaping the laminated article.

BRIEF DESCRIPTION OF THE DRAWINGS

The present disclosure can be more fully understood by reading the following detailed description of the preferred embodiments, with reference made to the accompanying drawings, wherein.

DETAILED DESCRIPTION

Figure 1A:
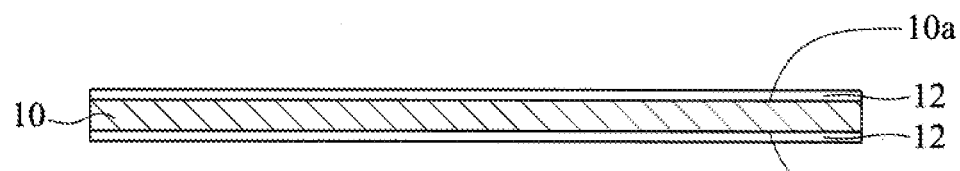
FIGS. 1A to 1C are schematic views illustrating the method for preparing the carbon fiber composite material according to Example 1 of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Typically, a multilayer carbon fiber composite material is prepared to form a laminated article, which has a plurality of superposed carbon fiber layers, and then is processed into a desired shape. In addition, the desired mechanical or physical properties are achieved by adjusting the angles of fibers between the upper carbon fiber layer and the lower carbon fiber layer.

It is found in the method of the present disclosure, the carbon fiber composite material having the carbon nanotubes-containing resin has significantly improved vibration damping.

The carbon fiber composite material comprises at least two carbon fiber layers, three to ten layers, or even more layers of the laminated structures. The present disclosure is illustrated by, but not limited to, following example.

Generally, the method for preparing the carbon fiber layers of the carbon fiber composite material is performed by manually laminating, spraying, laminating, continuously laminating, resin transfer molding, filament winding, sheet molding compound (SMC), bulk molding compound (BMC), pre-dip molding, autoclave molding and the like. Therefore, the carbon fiber layers used for preparing the carbon fiber composite material comprise polymers or the resin as described herein.

The present disclosure provides a method for preparing a carbon fiber composite material. The method includes providing a first carbon fiber layer and a second carbon fiber layer; binding a first surface of the first carbon fiber layer with the second carbon fiber layer to obtain a laminated article, wherein a resin containing carbon nanotubes is formed on the first surface or a second surface of the first carbon fiber layer, and the carbon nanotubes have functional groups on the surface thereof; and shaping the laminated article.

Example 1

Figure 1B:
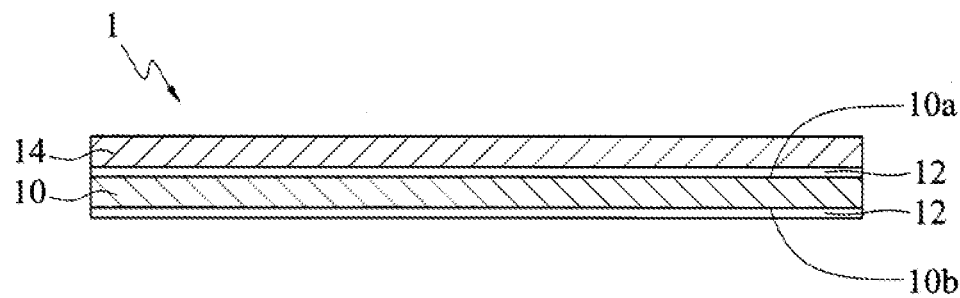
Figure 1C:
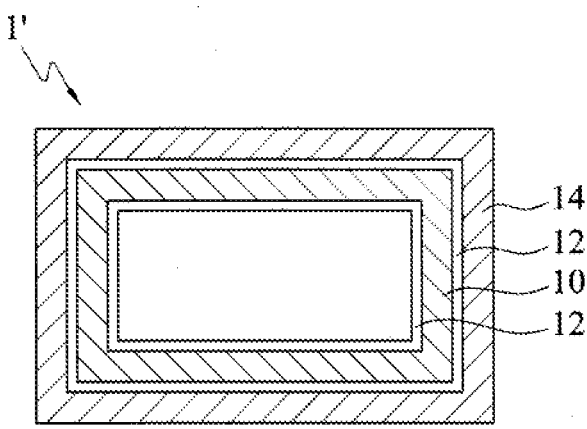

FIGS. 1A to 1C illustrate the method for preparing the carbon fiber composite material of the present disclosure.

As shown in FIG. 1A, a first carbon fiber layer 10 having a first surface 10a, and a second surface 10b opposing the first surface 10a is provided, a resin 12 containing carbon nanotubes is formed on the first surface 10a of the first carbon fiber layer 10, and the surfaces of the carbon nanotubes have reactive functional groups for binding with the resin 12. In this schematic diagram, the carbon fiber layer prepared by a pre-dip molding is used as the first carbon fiber layer 10, and both of the first surface 10a and the second surface 10b of the first fiber layer 10 have the resin 12 formed thereon. In other word, the first carbon fiber layer 10 is dip-coated with the resin 12.

However, the resin can be also formed on either one of the first and second surfaces of the first carbon fiber layer. In one embodiment, at least a portion of resin is disposed between the first carbon fiber layer 10 and a second carbon fiber layer 14 (referring to FIG. 1B). The thickness of the resin disposed between the first carbon fiber layer 10 and the second carbon fiber layer 14 is in a range of from 5 to 400 μm.

In addition, the carbon nanotubes are preferably a multilayer structure (multi-walled carbon nanotubes, MWCNT). The wall of the multilayers provides more micro-slide phenomenon, and the accumulated damping characteristics can be amplified rapidly, so as to have more effectiveness in inhibition of vibrations.

On the other hand, the carbon nanotubes are modified to have reactive functional groups, and the reactive functional groups can be, but not limited to, an amino group, carboxyl group, hydroxyl group or acyl chloride. The method for modifying the carbon nanotube can be referred to the method disclosed in J. Mater. Chem., 2011, 21, 7337-7342.

In one embodiment, the lowest effective amount of the carbon nanotubes is 1 wt % based on the weight of resin. When the amount of carbon nanotubes is increased, the rigidity is increased and it is more difficult to process. For workability, the amount of the carbon nanotubes is no more than 20 wt % based on the weight of the resin.

The resin used in the present disclosure is not particularly limited to a thermoplastic resin or a thermosetting resin as long as the resin can react with the reactive functional groups. In general, the resin is an epoxy resin to facilitate the formation of cross-linking.

Subsequently, as shown in FIG. 1B, the second carbon fiber layer 14 is bound to the first side of the first carbon fiber layer 10 to obtain a laminated article 1, and the laminated article 1 is then reshaped as shown in FIG. 1C. The laminated article 1 is processed into a carbon fiber composite material with a desired shape by using molds including a hollow tube, a square tube, a solid rod or the like. Moreover, it often makes the laminated article being heated during reshaping the laminated article while it makes the reactive functional group react with the resin, thereby hardening and setting the laminated article.

Example 2

Figure 2A:
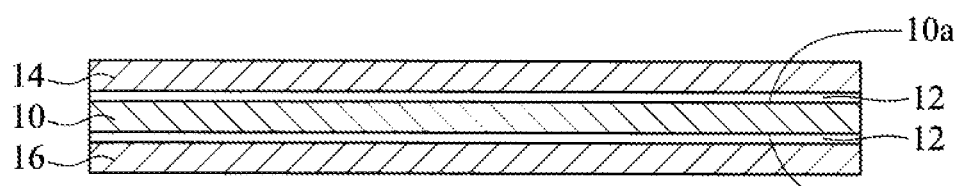
FIGS. 2A to 2B are schematic views illustrating the method for preparing the carbon fiber composite material according to Example 2 of the present disclosure.
Figure 2B:
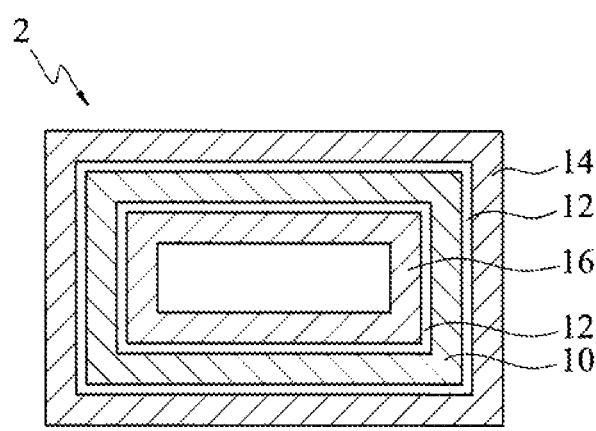

As shown in FIG. 2A, which is followed by the step in FIG. 1B, the method further comprises binding the second surface of the first carbon fiber layer 10 with a third carbon fiber layer 16 prior to shaping the laminated article 1, so as to dispose the first carbon fiber layer 10 between the second carbon fiber layer 14 and the third carbon fiber layer 16.

Afterward the laminated article 1 is shaped so as to obtain a carbon fiber composite material 2.

According to the method in the present disclosure, the present disclosure further provides carbon fiber composite materials 1' and 2, which comprise a first carbon fiber layer 10; a second carbon fiber layer 14; and a resin disposed between the first carbon fiber layer 10 and the second carbon fiber layer 14, wherein the resin contains carbon nanotubes and the carbon nanotubes have reactive functional groups on the surface thereof for binding with the resin.

The carbon fiber composite material can comprise a third carbon fiber layer 16 coupled to the first carbon fiber layer 10, so that the first carbon fiber layer 10 is disposed between the second carbon fiber layer 14 and the third carbon fiber layer 16.

In one embodiment, in the carbon fiber composite material which is superposed by multilayers (such as two layers, three layers or more layers), the first carbon fiber layer is coated with the resin.

The thickness of the resin disposed between the first carbon fiber layer and the second carbon fiber layer is in a range of from 5 to 400 μm.

In addition, the carbon nanotubes are preferably a multilayer structure (multi-walled carbon nanotubes, MWCNT). The wall of the multilayer provides more micro-slide phenomenon and the accumulated damping characteristics can be amplified rapidly, so as to have more effectiveness in inhibition of vibrations.

On the other hand, the carbon nanotubes are modified to have reactive functional groups and the reactive functional groups can be, but not limited to, an amino group, carboxyl group, hydroxyl group or acyl chloride. The method for modifying the carbon nanotubes can be referred to the method disclosed in J. Mater. Chem., 2011, 21, 7337-7342.

In one embodiment, the quantity of the carbon nanotubes is 1 to 20 wt % based on the weight of the resin.

The resin used in the present disclosure is not particularly limited to a thermoplastic resin or a thermosetting resin as long as the resin can react with the reactive functional groups on carbon nanotubes. Generally, the resin is an epoxy resin to facilitate the formation of cross-linking.

Test Example

Test Example 1: Measurement of the Vibration Attenuation Time of Hollow Rectangular Tubes Made of the Carbon Fiber Composite Material The carbon fiber composite material is prepared by the aforementioned method. The sample comprises 20 layers of the carbon fiber layer, in which there is the MWCNT-containing resin disposed between the 7th carbon fiber layer and the 8th carbon fiber layer and between the 13th carbon fiber layer and the 14th carbon fiber layer.

The following details describe the carbon fiber and the resin:

Carbon fiber: Toray, T700SC, 12K
Resin: epoxy resin (Dow Chemical, Epon 828)
Multilayer carbon nanotubes: 1 wt %, L-MWCNT1020, Xin Yun Enterprise
Modified functional group: amino group, according to the method disclosed in J. Mater. Chem., 2011, 21, 7337-7342

In shaping the laminated article, a core mold was provided, a plastic air pocket was put on the outside of the core mold, and the core mold was coated with the laminated article. The laminated article-covered core mold was placed inside an aluminum mold and fastened, followed by leaving the plastic pocket behind and removing the core mold. The space vacated by the core mold was inflated to 25 to 30 psi for shoring up the laminated article while the side of the aluminum mold was subjected to a pressure of 20 to 25 psi and heated to 160° C. for 40 minutes. Until cooling to the room temperature, the carbon fiber composite material can be removed (a rectangular tube: 300 mm (length)×27 mm (width)×11.2 mm (height); 2.5 mm (thickness)).

A laser displacement meter (Polytec OFV 350 Sensor hand) was used to measure time (second, S) for the vibration attenuation, i.e. to measure the time from the vibration beginning (one end of the sample was fixed and the other end of the sample was subjected to 2 Kg loading and then released) to stationary and the results were recorded in Table 1.

Test Example 2: Measurement of Time for the Vibration Attenuation of Hollow Round Tube Made of the Carbon Fiber Composite Material The carbon fiber composite material sample (a round tube: 300 mm (length)×20 mm (diameter); 4.0 mm (thickness)) was prepared by the same manner as Test example 1.

A laser displacement meter was used to measure time (second, S) for the vibration attenuation, i.e. to measure the time from vibration beginning to stationary, and the results were recorded in Table 1.

Test Example 3: Measurement of Time for the Vibration Attenuation of Bicycle Front Fork Tube Made of the Carbon Fiber Composite Material The carbon fiber composite material sample (a front fork tube, tube length: 320 mm; tube diameter: 1.125 inch; inclination: 45 mm) was prepared by the same manner as Test example 1.

A laser displacement meter was used to measure time (second, S) for the vibration attenuation time, i.e. to measure the time from vibration beginning to stationary, and the results were recorded in Table 1.

A laser displacement meter was used to measure the time (second, S) for the vibration attenuation, i.e. to measure the time from vibration beginning to stationary, and the results were recorded in Table 1.

Comparative Example 2: Measurement of Time for the Vibration Attenuation of Hollow Round Tube Made of the Carbon Fiber Composite Material The carbon fiber composite material sample (a round tube: 300 mm (length)×20 mm (diameter); 4.0 mm (thickness)) was prepared by the same manner as Test example 1 except that the sample contained 20 layers of the carbon fiber layer without the carbon nanotubes.

A laser displacement meter was used to measure the time (second, S) for the vibration attenuation, i.e. to measure the time from vibration beginning to stationary, and the results were recorded in Table 1.

Comparative Example 3: Measurement of Time for the Vibration Attenuation of Bicycle Front Fork Tube Made of the Carbon Fiber Composite Material The carbon fiber composite material sample (a front fork tube, tube length: 320 mm, tube diameter: 1.125 inch; inclination: 45 mm) was prepared by the same manner as the test example 1 except that the sample contained 20 layers of the carbon fiber layer without the carbon nanotubes.

A laser displacement meter was used to measure the time (second, S) for the vibration attenuation, i.e. to measure the time from vibration beginning to stationary, and the results were recorded in Table 1.

TABLE 1

|  | numbers of the carbon fiber layers | presence or absence of the carbon nanotubes | the amount of the carbon nanotubes | numbers of layers of the resin containing the carbon nanotubes | the position of the resin layer | time (S) for vibration attenuation |
|---|---|---|---|---|---|---|
| Test example 1 | 20 | multilayer | 1 wt % | 2 | between the $7^{th}$ layer and the $8^{th}$ layer, between the $13^{th}$ layer and the $14^{th}$ layer | 0.49 |
| Test example 2 | 20 | multilayer | 1 wt % | 2 | between the $7^{th}$ layer and the $8^{th}$ layer, between the $13^{th}$ layer and the $14^{th}$ layer | 0.68 |
| Test example 3 | 20 | multilayer | 1 wt % | 2 | between the $7^{th}$ layer and the $8^{th}$ layer, between the $13^{th}$ layer and the $14^{th}$ layer | 0.24 |
| Comparative example 1 | 20 | nil | 0 wt % | 0 |  | 1.39 |
| Comparative example 2 | 20 | nil | 0 wt % | 0 |  | 1.12 |
| Comparative example 3 | 20 | nil | 0 wt % | 0 |  | 0.43 |

Comparative Example 1: Measurement of Time for the Vibration Attenuation of Hollow Rectangular Tubes Made of the Carbon Fiber Composite Material The carbon fiber composite material sample (a rectangular tube: 300 mm (length)×27 mm (width)×11.2 mm (height); 2.5 mm (thickness)) was prepared by the same manner as Test example 1 except that the sample contained 20 layers of the carbon fiber layer without the carbon nanotubes.

The numbers of the resin layers were calculated by taking the carbon fiber layer with the resin as a single layer.

The position of the resin layer was determined by taking the outermost carbon fiber layer of the sample as the first layer.

According to the results shown in Table 1, the MWCNT-containing carbon fiber composite material has significantly reduced the vibration attenuation time.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for preparing a carbon fiber composite material, comprising:
    providing a first carbon fiber layer and a second carbon fiber layer;
    binding a first surface of the first carbon fiber layer with the second carbon fiber layer to obtain a laminated article, wherein a resin containing 1 to 20 wt % of multilayer carbon nanotubes, based on a weight of the resin, is formed on the first surface or a second surface opposing the first surface of the first carbon fiber layer, and the multilayer carbon nanotubes have functional groups on a surface thereof, and wherein the functional group of the multilayer carbon nanotube is amino group, carboxyl group, hydroxyl group or acyl chloride; and
    shaping the laminated article.

2. The method of claim 1, wherein at least a portion of the resin is disposed between the first carbon fiber layer and the second carbon fiber layer.

3. The method of claim 2, wherein a thickness of the resin disposed between the first carbon fiber layer and the second carbon fiber layer is in a range of from 5 to 400 μm.

4. The method of claim 1, wherein the resin is a thermoplastic resin or a thermosetting resin.

5. The method of claim 4, wherein the resin is an epoxy resin.

6. The method of claim 1, further comprising:
    binding the second surface of the first carbon fiber layer with a third carbon fiber layer prior to shaping the laminated article, so as to dispose the first carbon fiber layer between the second carbon fiber layer and the third carbon fiber layer.

7. The method of claim 1, wherein the first carbon fiber layer is encapsulated by the resin.

8. The method of claim 1, wherein the second carbon fiber layer comprises a polymer.

9. The method of claim 6, wherein the third carbon fiber layer comprises a polymer.

* * * * *